Sept. 10, 1968 E. B. ACKERMAN 3,400,515
PRODUCTION OF WATER FROM THE ATMOSPHERE
Filed May 2, 1966 2 Sheets-Sheet 1
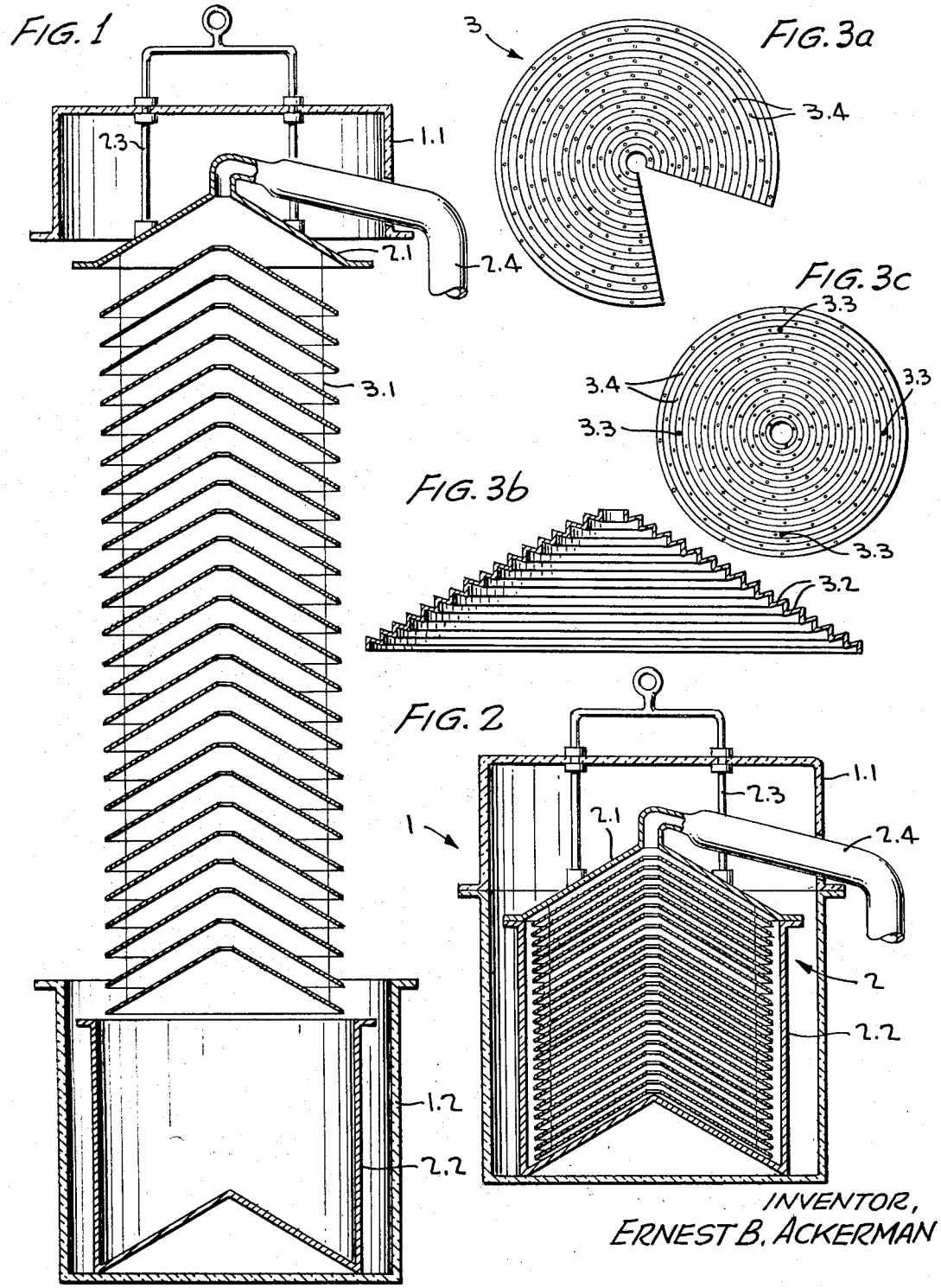
INVENTOR,
ERNEST B. ACKERMAN Sept. 10, 1968   E. B. ACKERMAN   3,400,515
PRODUCTION OF WATER FROM THE ATMOSPHERE
Filed May 2, 1966   2 Sheets-Sheet 2

INVENTOR,
ERNEST B. ACKERMAN

United States Patent Office 3,400,515
Patented Sept. 10, 1968

3,400,515
PRODUCTION OF WATER FROM THE ATMOSPHERE
Ernest B. Ackerman, 1537 N. Marion, Denver, Colo. 80218
Continuation-in-part of application Ser. No. 457,724, May 21, 1965. This application May 2, 1966, Ser. No. 546,800
2 Claims. (Cl. 55—179)

ABSTRACT OF THE DISCLOSURE

An apparatus for recovering potable water from the atmosphere is described. The apparatus is based on the principle that air in a given environment will become saturated and produce water vapor provided the air space is minimized. The device permits exposing large surface areas of a hydrophilic material to the atmosphere to collect water and the enclosure of the hydrophilic material containing the collected water in a minimum air space to produce liquid water.

---

Figure 4:
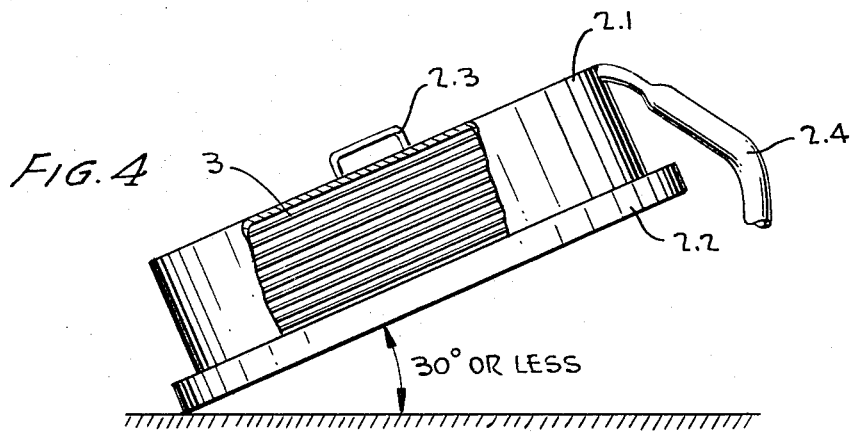

This application is a continuation-in-part of co-pending application Ser. No. 457,724 filed May 21, 1965, now abandoned.

The present invention relates to a basic device for extracting liquid water from the atmosphere comprising the steps of collecting atmospheric moisture by means of a hydrophilic substance under select conditions and, thereafter, extracting water from said substance under select conditions.

In the world today, with the expanding population and the depletion and polution of natural water reservoirs, such as rivers and lakes, a very definite and substantial need exists for a relatively simple, inexpensive means of providing potable water for human and animal consumption, and for agricultural needs, such as irrigation. This need, while being most critical in the arid or semi-arid regions, extends to the more temperate regions of the world. Particularly in the remote arid regions, the expense of drilling wells, the most common source of water other than lakes, rivers and the like, is prohibitive primarily in view of the low success factor in obtaining water at reasonable depths.

It is an object of this invention to provide a device for producing water directly from the atmosphere at practically any point on the earth's surface employing relatively simple means.

It is another object of this invention to provide a device for producing water directly from the atmosphere which is simple in construction and operation, and which will operate at substantially any point on the earth's surface, said device being substantially free of moving, wearing, and/or consumable parts.

It is still another object of this invention to provide a device for the recovery of a vaporous or gaseous material from a select environment.

These and other objects of the invention will become more readily apparent from the following detailed description, with particular emphasis being placed on the embodiments shown in the drawing, which are set forth solely for illustrative purposes.

The basic and unique concept utilized in accomplishing the objectives of the present invention is based on the principle that the condensation point of a vapor, for example water vapor, in the atmosphere can be reached at any constant or near constant temperature by reducing the weight or volume of free air space. More specifically, the aforesaid objects of producing water are accomplished to a degree by capitalizing on the changes in the humidity of the earth's atmosphere at different periods in a given 24-hour or shorter duration as exemplified by, but not limited to, periods of day and night and to compensating physical phenomena. For example, the temperature at night in any 24-hour period is normally lower and the humididity conditions higher. Therefore, according to one aspect of the invention, relatively large surface areas of a material which has an affinity for water (referred to as a hydrophilic material hereinafter) are exposed in numerous thin layers to the night atmosphere for collection of moisture from the air. During the day, the layers of hydrophilic material with the collected or fixed water are enclosed in a suitable container which has a minimum of free air space, and the closed container exposed to the relatively higher heat of the day. The increase in temperature, e.g., the heat from the sun, liberates the water collected within the previously exposed materials primarily as a gas or vapor, increasing the pressure within the container. Since the air space or the amount of air in the container has been reduced to a small amount, the near-saturation point of the air is readily reached. The placing of a small opening in the container, preferably at the top, permits the exit of the water vapor from the container and its collection as liquid water through condensation. Inasmuch as the process is in effect a distillation, the liquid water collected is completely safe for human and animal consumption.

Before defining the various ramifications of the invention in greater detail, for convenience in understanding the disclosed concept, preferred illustrative embodiments will be described with particular reference being made to the drawing which forms a material part of this disclosure and wherein like numerals are used throughout to designate like parts.

Figure 5:
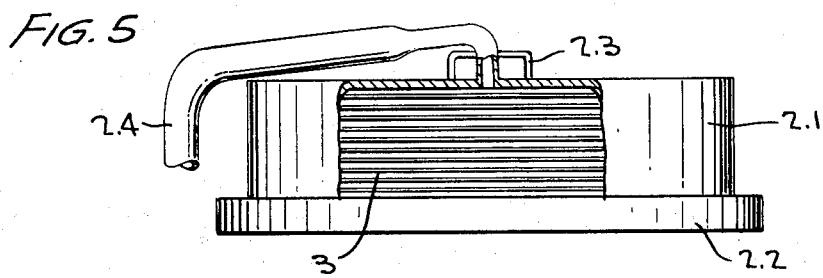
Figure 6:
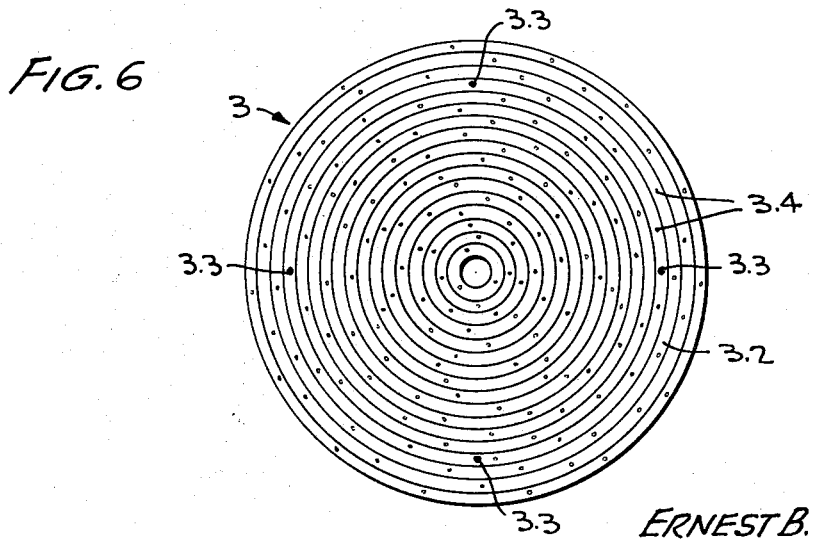

In the drawing, FIGURE 1 is a front view in cross-section of a water collection device with the materials having an affinity for water exposed;

FIGURE 2 is a front view in cross-section of the water collection device of FIGURE 1 in the water extracting, or reposed position;

FIGURES 3a, 3b, and 3c illustrate the plates used in the apparatus of FIGURES 1 and 2 to retain the hydrophilic material;

FIGURES 4 and 5 are elevational views, partly broken away, of modified apparatus in the water extracting or reposed position; and FIGURE 6 illustrates a circular plate of the type used in the apparatus of FIGURES 4 and 5 to retain the hydrophilic material.

More specifically, referring to FIGURES 1, 2, and 3 of the drawing, the water-producing device comprises a glass "greenhouse" container 1 having a cover portion 1.1 and a receptacle portion 1.2. Positioned within the greenhouse container is a second container 2 comprising a lid 2.1 and a receptacle portion 2.2. Lid 2.1 possesses a handle 2.3 which extends through glass cover 1.1. A narrow diameter pipe 2.4 is operably associated with lid 2.1 and extends through the wall and to the outside of greenhouse container 1. The second container receives a plurality of closely spaced cone-shaped plates 3 uniformly spaced and connected by suitable means such as nylon threads 3.1. The cone-shaped plates have substantially the same dimensions and configuration as the container so that the air space in the container is as small as possible while permitting convenient removal of the cones from the container.

In the operation of the device, for example in a 24-hour day and night cycle, at sunset lids 1.1 and 2.1 are lifted and placed on a suitable retainer, such as a hook, so that the cone-shaped plates retaining the hydrophilic material are suspended in the air, completely free of the container. In this position, the cone-shaped plates are also free of each other, permitting the night air to circulate across and between the plates with moisture from the air being taken up by the hydrophilic material. At sunrise, the containers are closed in order that the cone-shaped plates and the hydrophilic material contained thereon are enclosed within receptacle 2 and within the greenhouse container 1. The heat of the day penetrates the green house container and is absorbed by container 2. The absorbed heat liberates the water collected as a gas or vapor. Due to the reduced air space, or the very small amount of air in the container, the saturation point is soon approached. Due to the vapor pressure of the water vapor within the container, it is forced to pass to pipe 2.4. As a result of the relatively cooler surface within the pipe, the water vapor condenses therein as it is near the saturation point and a slight decrease in temperature results in the dew point being reached. The liquid water is collected in a suitable retainer, not shown.

In the embodiment shown in FIGURES 1, 2, and 3, the cone-shaped plates comprise a sheet of metal or plastic about 0.0100 to 0.0200 inch in thickness. The metal or plastic sheet is cut into circular plates 12 inches in diameter for a small model, but may be of any diameter to make correspondingly larger or smaller devices. Grooves 3.2 are pressed, or cut into the round plates, somewhat on the order of a phonograph record, but being wider and deeper. The purpose of the grooves is to retain the material having an affinity for water. In the embodiment shown, the plates will contain a plurality of minute holes 3.4 which permit the vapors and gases to move to the nearest of said holes and upward. The number of the holes is adjusted in order that no pockets are formed preventing the vapors or gases from moving upward. The holes must be small enough so that the hydrophilic substance contained thereon will not filter through. Alternatively, the plurality of holes can be replaced by a center hole. In such an embodiment, the vapors or gases will move to and upward through the single passage. For plates 12 inches in diameter, the center hole is approximately $\frac{1}{16}$ inch. A section is cut out of the circular plates and is removed so that when the two ends are placed together, a thirty-degree cone will be formed. The final cone will have the appearance as seen at FIGURES 3b and 3c. A hydrophilic material, such as magnesium sulfate·$7H_2O$ is placed or dusted onto the surface of the metal or plastic cone and allowed to settle into the grooves. Depending upon the capacity of the water-producing device, a select number of such cones are placed one on top of the other. Cones are attached by suitable means, as for example by threads, at four equally spaced points 3.3 on the cone, as seen most clearly in FIGURE 3c. When suspended, the cones will appear substantially as seen in FIGURE 1. The cones are preferably spaced close together, but yet far enough part so that moist air can come into contact with the hydrophilic material. Preferably, the layer of water-attracting material will be as thin as possible to obtain the most efficient use of the substance. Ideally, the layer will have the thickness of one crystal of the hydrophilic substance. The entire stack of cone-shaped plates will fit into container 2 which preferably has substantially the same configuration as the stack of cones. The essential feature is that the empty space or voids in the filled container be held to a practical minimum. Thus, substantially no space is to be left along the sides, that is, between the edges of the plates and the side walls of the container. It is desirable to have a close fit, but yet one which will permit the plates to be lifted out without undue difficulty.

Container 2 is preferably constructed from a metal which absorbs and readily conducts thermo-energy. For this reason, a naturally black metal or metal which has been painted black is desirable for the container construction. This material will readily absorb the heat energy needed to liberate the water from the hydrophilic substance. The metal pipe, which is positioned at the apex of the container lid 2.1 is deflected to a slant position below the horizontal, immediately after exiting from the apparatus. After the downward turn, the inside diameter preferably is enlarged from that shown at the apex for the duration of its length. The shape of the pipe can be altered, i.e., flattened, elongated, spiraled, or the like, to afford greater heat transfer. The pipe is preferably constructed from a heat reflective material, or a material which is coated with a heat reflective paint. In this manner, the pipe having a relatively cool surface and confined area will cause the water vapors to liquefy. The downward slant of the pipe immediately as it emanates from the container prevents drip-back of the condensed water. In the event drip-back is still a problem, the heat reflective material or coating can be utilized only after the pipe is deflected downward. In this way, the prevailing temperature within the enclosed device will be maintained at the initial point of exhaustion, preventing premature condensation and blocking of the exit.

The device as shown in FIGURES 1 and 2, where container 2 is approximately the height of a two-pound coffee can, and containing 500 cone-shaped plates retaining $MgSO_4·7H_2O$ as the hydrophilic material will deliver approximately one quart of liquid water on an average summer day in the mid-western United States.

The apparatus hereinbefore described is designed to take advantage of the change in state from a fixed solid or liquid to a gas which involves a tremendous change in volume. When this change in state occurs, the change in volume is utilized in moving the gas or vapor toward the opening or openings in the individual plates and upward to the opening in the container. Upon entering the small bore pipe, the gaseous water, leaving a relatively hot area and entering a relatively cool area, condenses. The liquid water flows to the outside of the greenhouse container for collection. The essential purpose of packing the plates together as closely as possible, and the use of the small bore pipe is to limit the air space within the container and maintain the internal system as near to the saturation point of the air as possible. A secondary purpose of closely packing the plates is that when an exchange of volume does occur, it can only move from the inside of the system to the outside.

Although the spacing between the cones or plates is not overly critical, an optimum spacing for the efficient production of water can be determined by reference to a standard Molal Humidity Chart. For example, at a temperature of 90° F., with a prevailing humidity of 0.004 pound/moles water vapor per pound/mole dry air, the dew point is reached by reducing the free air space so as to create an 0.05 molal humidity. Reducing the free air space beyond the above point will create a super-saturated condition where liquid water will form within the device. In comparison to the above, given a temperature of 70° F. with the same initial molal humidity, the dew point is reach by reducing the free air space so as to create a 0.025 molal humidity. However, this humidity is reached at a point where the free air space is greater relative to that necessary to reach the saturation point at 90° F. Thus, a relatively greater free air space will achieve the saturation condition as the temperature is reduced. Therefore, the tolerances, while not being overly critical, are important. The plates and cones cannot fit together so tightly as to completely eliminate an air space laterally between one groove and the next on the same plate or cone. On the other hand, the space between the plates should not be so great as to eliminate conditions necessary for reaching the dew point. From a practical standpoint, a minimum spacing of 0.001 inch or greater must be maintained between the plates or cones depending upon the general prevailing climatic conditions that exist within a broad geographical region. This tolerance is also important from the standpoint of preventing the bottom of one tray from touching the hydrophilic material on the tray beneath it. Small projections on the surface of each tray at strategic locations can assure the maintenance of the necessary tolerance levels. The maximum spacing is from about 0.025 inch to permit the conditions necessary for reaching the dew point.

Although the aforesaid description refers to a night/day operation in the production of usable quantities of water, it should be appreciated that this is only a preferred embodiment which utilizes the high humidity/low temperature and low humidity/high temperature conditions. Although such conditions are advantageous, they are not necessary or critical to the effective operation of the unit. The hydrophilic material will gather moisture from the atmosphere at any time it is exposed, night or day, as long as zero humidity conditions do not exist. While the collection will be more rapid during high humidity conditions, even the lowest daytime humidity conditions will charge the hydrophilic material to some extent. This is particularly true since the amount of air available to flow through the unit is limitless. Furthermore, the temperature is not critical. Once the unit is closed, or in the reposed extracting position, the air cooling effect on the open plates is terminated and a slight temperature rise will naturally occur. Higher temperatures are preferred in that such conditions speed the dissociation and vaporization of the water. As noted hereinbefore, the critical factor in the process is the special relationships that exist when the unit is closed. As these relationships reduce the volume of free air to a minimum, the saturation point of the water vapor is reached with only a slight rise in temperature. As is apparent, therefore, it is not necessary to operate the unit on a day and night basis but it is possible to employ the unit during substantially any cycle.

FIGURES 4 and 5 illustrate modified designs of the apparatus used in practicing the invention. According to the apparatus in FIGURE 4, the plates are flat, i.e., not cone shaped as shown in FIGURES 1, 2, and 3. The apparatus in the reposed or water-producing position is placed at a slant of about thirty degree or less. The slant is such that the hydrophilic material on the plates which are grooved or indented will not spill forward. However, the slant utilizes the natural phenomenon of water vapors to move upward. In operation, the water vapor released from the plates will rise upward to the edge of the container and out through the small diameter pipe. The pipe again is of sufficient length to permit the relative cooling of the vapors which pass down through the pipe to form water in the lower portion. The plates may contain a plurality of minute holes to permit the upward passage of water vapors or they can be non-porous.

FIGURE 5 utilizes a construction similar to that shown in FIGURE 4. However, neither the apparatus in the reposed position nor the plates are maintained at a slant. The plates, however, contain a plurality of minute holes which are distributed and in sufficient number so that none or only relatively insignificant vapor pockets are formed. The plates are preferably staggered so that the minute holes do not match up, causing horizontal movement of the vapor, and help move stagnant vapors which may be caught in a vapor pocket. The plates again are indented or grooved to hold the hydrophilic material in position. The principle of operation utilized in FIGURES 4 and 5 is the same as that indicated in the description of the embodiment shown in FIGURES 1, 2 and 3.

In summary, it is seen that the operation of the device of the present invention is a combination of theories involving (1) the concentration of water vapor from the atmosphere of thousands of feet of air in a hydrophilic material exposed in thin layers on replicated retainers to provide a maximum surface area for collection of the water vapor within a confined area; (2) elimination of air space by enclosing retainers carrying the saturated hydrophilic material within a container in compact relationship; (3) supplying heat energy to the container to liberate water from the hydrophilic material, in the form of a gas or vapor, thereby causing a change in volume which drives the water vapor out of the container; and (4) collecting the evolved water vapor in a conduit opening associated with the container, having a confined area which is relatively cooler, causing the evolved water vapor to liquefy, permitting its collection. As will be appreciated, the essential feature as indicated hereinbefore is to maintain the air space within the receptacle housing the hydrophilic material as small as possible.

As will be apparent, the embodiments set forth hereinbefore are illustrative only. The actual configuration of and number of plates retaining the hydrophilic material and the container therefore is not critical. The configuration can vary depending upon the ultimate environment in which the device is to be employed. Furthermore, the size of the plates is not critical and depends to a large extent upon the area of the world in which the device is to be employed, and the amount of water which is desired to be collected in any given period. The selection of the proper material for constructing the plates and their size will be apparent to one skilled in the art from the aforesaid description once the particular capacity of the device and other considerations are known.

There are numerous hydrophilic materials which can be selected for use in the presently described device. Again, the proper selection will depend in part upon the particular area in which the water extracting device is to be employed and the desired temperature ranges of dissociation of the hydrophilic molecule. As will be apparent to one skilled in the art, one particular hydrophilic material may be more practical in a particular climate. For example, referring to the magnesium sulphate hydrate used in the preferred embodiment, at 66° F., one molecule of water will be removed from the hydrate initially containing 7 molecules of water. Thus, 18 grams of water will be obtained for every 245 grams of hydrophilic material. On the other hand, at 95° F., the same material will liberate 5 molecules of water or 90 grams of water are obtained for every 245 grams of the original hydrate. Therefore, virtually any material which has an affinity for water can be utilized, such as the hydrates which are true chemical compounds, materials having hydroscopic or deliquescent properties, and materials which merely have an affinity for adsorbing and/or absorbing water such as charcoal, silica gel, soap, and the like. All of these materials are operable, with the only critical feature being that they can be conveniently retained upon a suitable retainer for exposure to the atmosphere.

Furthermore, the materials for the containers employed herein are not particularly critical and can be fabricated from metals, plastics, or the like. However, the inner container should be conductive of thermo-energy for efficient operation. Although desirable for the most efficient operation, the second container or greenhouse container as illustrated in the embodiment shown in FIGURES 1 and 2 of the drawing can be eliminated with the heat being supplied directly to the container retaining the plurality of plates. Again, however, for the most efficient operation of the unit, for example to eliminate disturbances due to the wind and the like, the greenhouse container is desirable.

As noted hereinbefore, the water-producing device of the present invention permits the production of usable amounts of water at virtually any point on the surface of the earth. The only conditions of inoperability are when the temperature drops below the freezing point of water, simply because the water in the unit will freeze, or at conditions of zero humidity. As will be apparent, however, if it is desirable to produce water at freezing temperatures, the device can be placed in a suitable housing maintained above the freezing point of water and the cold, humid air permitted to pass through the unit. As to the latter condition, there is virtually no place on the surface of the earth where zero humidity conditions occur for extended periods of time.

As will be apparent, the conditions prevalent in arid and semi-arid regions where water is most desperately needed are the most satisfactory for operation of the present device. Thus, the most efficient conditions for the water-producing device of the present invention are those wherein the variation in humidity and temperature is the greatest. In the desert, where the temperature and humidity fluctuation is great during the day and night, the device will produce large amounts of water. On the other hand, where the humidity and temperature conditions are most uniform, the device will operate less efficiently. However, as indicated hereinabove, by properly selecting the materials of the unit to take advantage of changing conditions, such as a second "greenhouse" container, heat-absorbing paint on the first container and heat-reflecting paint on the exhaust pipe, the unit can be made to be highly efficient under the most adverse conditions. Other modifications of the above type will be apparent to the skilled technician.

The device of the invention has numerous applications primarily because of the simplicity of the unit, both in construction and operation, permitting its employment in virtually any area of the country, including areas where the inhabitants are not trained to operate complex devices. Moreover, the fact that the units can be produced in substantially any size permits their application for substantially any use. For example, a plurality of units can be employed in an agricultural development. These units can be equipped with devices which are sensitive to light and dark, such as the selenium light-sensitive cell, which will automatically open and close the units. Other devices are available which are sensitive to the humidity content of the air which will function satisfactorily for controlling the units. Extremely large units can be constructed to furnish relatively large amounts of water. As will be apparent to one skilled in the art, the supplemental accessories that may be attached to the basic unit for refined operation are too numerous to set forth herein. However, as an example, an electric fan can supplement the wind and an electric heater can be placed at the bottom of the unit to provide heat to supplement or replace sunlight, and the device operated continuously, opening and closing hourly. Since the devices are extremely simple, with no moving or consumable parts, their continued use over extended periods of time actually lowers the unit's cost of the water produced.

Moreover, although the present device is primarily concerned with the production of usable quantities of water from the atmosphere, it is possible to employ the concept of the invention for the recovery of vapor or gaseous materials other than water from the atmosphere. Thus, exhaust fumes can be removed from a select atmosphere, for example an industrial plant, and recovered for further use. For example, instead of employing a hydrophilic material in the apparatus, a material which selectively adsorbs an organic material such as alcohol, benzene, ammonia, or the like, can be exposed and the adsorbed material thereafter recovered in a manner similar to the recovery of water described hereinbefore. More specifically, charcoal or some other material which has an affinity for a particular atmosphere, such as alcohol, can be thinly spread onto retaining plates and suspended within or in close proximity to an exhaust exist in a petrochemical or chemical plant for the collection of the particular gases or vapors. Packing of the plates within a container having an absolute minimum of air space and the application of artificial heat, or the heat of the environment will result in the dissociation, vaporization and recovery of the material by condensation. As will be apparent to one skilled in the art, by suitable modification and selection of materials, virtually any substance can be collected in usable quantities from the atmosphere.

As will be further apparent to one skilled in the art, numerous modifications can be made to the illustrative device without departing from the inventive concept herein described. Such embodiments, being within the ability of one skilled in the art, are intended to be covered with the invention only being limited by the appended claims.

It is claimed:

1. An apparatus for extracting usable water from the atmosphere, which permits the exposure of a hydrophilic material to the atmosphere and thereafter, the enclosure of said hydrophilic material in a confined space, comprising a container having a lid portion with opening means and a receptacle portion; a plurality of elements for containing the hydrophilic material in association with said container, said elements being flat plates having grooves thereon and having minute openings distributed therein, means for securing said elements together in varying spaced relationship, conduit means associated with said opening means in said lid portion for removal of a liquid from said container, said conduit means slanting downward from said point of association with said lid, portion said container having the approximate configuration of said plurality of elements when in closely spaced relationship, said container having only limited air space when said plurality of elements are within the container and the container closed.

2. The apparatus of claim 1 which includes a second container comprising a lid portion and receptacle portion which encloses the first container.

References Cited

UNITED STATES PATENTS

| | | | |
|---|---|---|---|
| 2,138,689 | 11/1938 | Altenkirch | 55—33 X |
| 2,462,952 | 3/1949 | Duckak | 55—208 X |
| 3,243,942 | 4/1966 | Burke | 55—387 |

FOREIGN PATENTS

| | | |
|---|---|---|
| 1,113,319 | 8/1961 | Germany. |

REUBEN FRIEDMAN, *Primary Examiner.*

C. N. HART, *Assistant Examiner.*